United States Patent
Ishii et al.

(10) Patent No.: US 7,558,448 B2
(45) Date of Patent: Jul. 7, 2009

(54) OPTICAL SWITCHING SYSTEM AND CONTROL METHOD FOR MICRO MIRROR

(75) Inventors: Yuji Ishii, Fukuoka (JP); Shinji Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/987,580

(22) Filed: Nov. 30, 2007

(65) Prior Publication Data

US 2008/0212157 A1 Sep. 4, 2008

(30) Foreign Application Priority Data

Jan. 15, 2007 (JP) ............................. 2007-006401

(51) Int. Cl.
*G02B 6/35* (2006.01)
(52) U.S. Cl. ....................................... 385/18
(58) Field of Classification Search ................. None
See application file for complete search history.

(56) References Cited

U.S. PATENT DOCUMENTS

| 6,711,314 | B1 | 3/2004 | Mori et al. |
| 7,155,125 | B2 | 12/2006 | Mori |
| 2002/0171420 | A1 | 11/2002 | Chaparala et al. |
| 2004/0037490 | A1 | 2/2004 | Tochio et al. |
| 2004/0057655 | A1 | 3/2004 | Mori et al. |
| 2004/0141682 | A1 | 7/2004 | Mori |
| 2005/0152015 | A1 | 7/2005 | Anderson et al. |

FOREIGN PATENT DOCUMENTS

| EP | 1 189 477 | 3/2002 |
| JP | 2003-29171 | 1/2003 |
| JP | 2004-85596 | 3/2004 |
| JP | 2004-219469 | 8/2004 |

OTHER PUBLICATIONS

Extended European Search Report issued Apr. 25, 2008 in corresponding European Patent Application No. 07023298.8.

*Primary Examiner*—Omar Rojas
(74) *Attorney, Agent, or Firm*—Staas & Halsey LLP

(57) ABSTRACT

An optical switching system includes a connection information memory portion (21) that stores connection information between input ports and output ports, a control characteristic memory portion (23) that stores control characteristic data of micro mirrors with respect to each of a plurality of temperatures, a temperature sensor (25) that senses a temperature in the optical switching system, and a computing portion (22) that refers to the control characteristic data stored in the control characteristic memory portion so as to calculate a controlled variable for the angle control of the micro mirrors based on the connection information stored in the connection information memory portion and the temperature sensed by the temperature sensor.

8 Claims, 16 Drawing Sheets

LOW TEMPERATURE
(CONTRACTION)

HIGH TEMPERATURE
(EXPANSION)

OPTICAL SWITCHING SYSTEM AND CONTROL METHOD FOR MICRO MIRROR

BACKGROUND OF THE INVENTION

1. Field of the Invention

The present-invention relates to an optical switching system that uses micro mirrors such as MEMS (Micro Electro Mechanical Systems) mirrors for switching optical signals entering from an input port and sending out a selected optical signal and a control method for the micro mirrors in the optical switching system. For example, the present invention can be used for an OXC (Optical Cross-Connect) system or the like of WDM (Wavelength Division Multiplexing) communication, space division communication or the like.

2. Description of the Prior Art

Recently, a micro machine device has become a focus of attention, which has a micro structure obtained through a process of micro machine processing technique (also referred to as MEMS [Micro Electro Mechanical Systems] or MST [Micro System Technology]). As one of the micro machine devices, a micro mirror (or a DMD [Digital Micro-mirror Device]) is developed and used for an optical switching system that is installed in a node of an optical network.

The optical switching system includes a plurality of micro mirrors having reflection planes whose angles can be controlled and that are arranged on a plane. Optical signals that enter a plurality of input ports are reflected by the plurality of micro mirrors and are led to selected corresponding output ports among a plurality of output ports. Since the micro mirrors are controlled and the ports are switched in this way, it is possible to perform optical exchange of a plurality of channels of optical signals on an optical transmission path.

However, since the optical system of the optical switching system including lenses and the micro mirrors has a three-dimensional structure, optical transmission characteristics alter largely in accordance with expansion or contraction due to variation of temperature. As a result, an optical coupling loss may vary largely.

Conventionally, in order to reduce influence of such temperature variation, there is proposed a method of compensating a temperature drift component by feedback control so that an optimal driving state is maintained (see U.S. patent application publication No. US2004/0037490).

In addition, U.S. Pat. No. 7,155,125 proposes a method in which a memory portion for storing control information about a tilt angle of each micro mirror corresponding to setting of an optical path with respect to a specific reference temperature and a temperature sensor for measuring temperature of an optical switch are provided, and when request for connecting an optical path is issued, control information corresponding to the request is read out from the memory portion, drive voltage compensated with deviation due to temperature variation to the reference temperature is calculated based on temperature measured by the temperature sensor, and the calculated drive voltage is used as an initial value.

However, in the case of the method in which the feedback control is performed as described in U.S. patent application publication No. US2004/0037490, although the temperature variation can be compensated securely, there is a problem that the circuit structure becomes complicated, and the circuit element or the circuit board is required to have a large mounting area.

In addition, in the case of the method in which the deviation due to temperature variation from the reference temperature is determined by calculation as proposed in U.S. Pat. No. 7,155,125, although the circuit structure becomes simplified, there is a problem that if the temperature variation from the reference temperature is large, an error thereof is large. In particular, influence due to temperature variation is large when loss adjustment is performed by using attenuation of VOA (Variable Optical Attenuator). When this attenuation is used, there is a problem that it is difficult to perform the compensation with high accuracy, and accuracy is lowered easily.

In addition, there is a large difference between the temperature time constant of the temperature sensor and a temperature time constant of a switch fabric that is a structural element of the optical switching system, so this difference may cause a large error in the control.

SUMMARY OF THE INVENTION

An object of the present invention is to provide a control method for a micro mirror and an optical switching system, which enables stable control with high accuracy by suppressing influence of temperature variation without a complicated structure even in a state with attenuation given.

An optical switching system according to an embodiment of the present invention includes a connection information memory portion that stores connection information between input ports and output ports, a control characteristic-memory portion that stores control characteristic data of micro mirrors with respect to each of a plurality of temperatures, a temperature sensor that senses a temperature in the optical switching system, and a computing portion that refers to the control characteristic data stored in the control characteristic memory portion so as to calculate a controlled variable for angle control of the micro mirrors based on the connection information stored in the connection information memory portion and the temperature sensed by the temperature sensor.

The control characteristic data of the micro mirrors is stored with respect to each of a plurality of temperatures, and appropriate data is selected from a plurality pieces of control characteristic data based on the sensed temperature, and the controlled variable of the micro mirror is obtained based on the selected data. Therefore, even if it is a simple structure, influence due to a temperature variation is suppressed so that the control can be performed stably with high accuracy.

In addition, an optical switching system according to another embodiment of the present invention further includes a temperature estimating portion that estimates a temperature of a member that constitutes the optical switching system based on the temperature sensed by the temperature sensor. The computing portion refers to the control characteristic data stored in the control characteristic memory portion so as to calculate a controlled variable for the angle control of the micro mirror based on the connection information stored in the connection information memory portion and the temperature estimated by the temperature estimating portion.

Since inside temperature of a main fabric such as the micro mirror is estimated, a shift between the actual temperature and temperature to be used for the control can be reduced so that the control can be performed more accurately.

According to the present invention, the control can be performed stably with high accuracy by suppressing influence due to temperature variation without a complicated structure even in a state with attenuation.

DESCRIPTION OF THE PREFERRED EMBODIMENTS

The invention will now be described in detail with reference to the attached drawings.

First Embodiment

Figure 1:
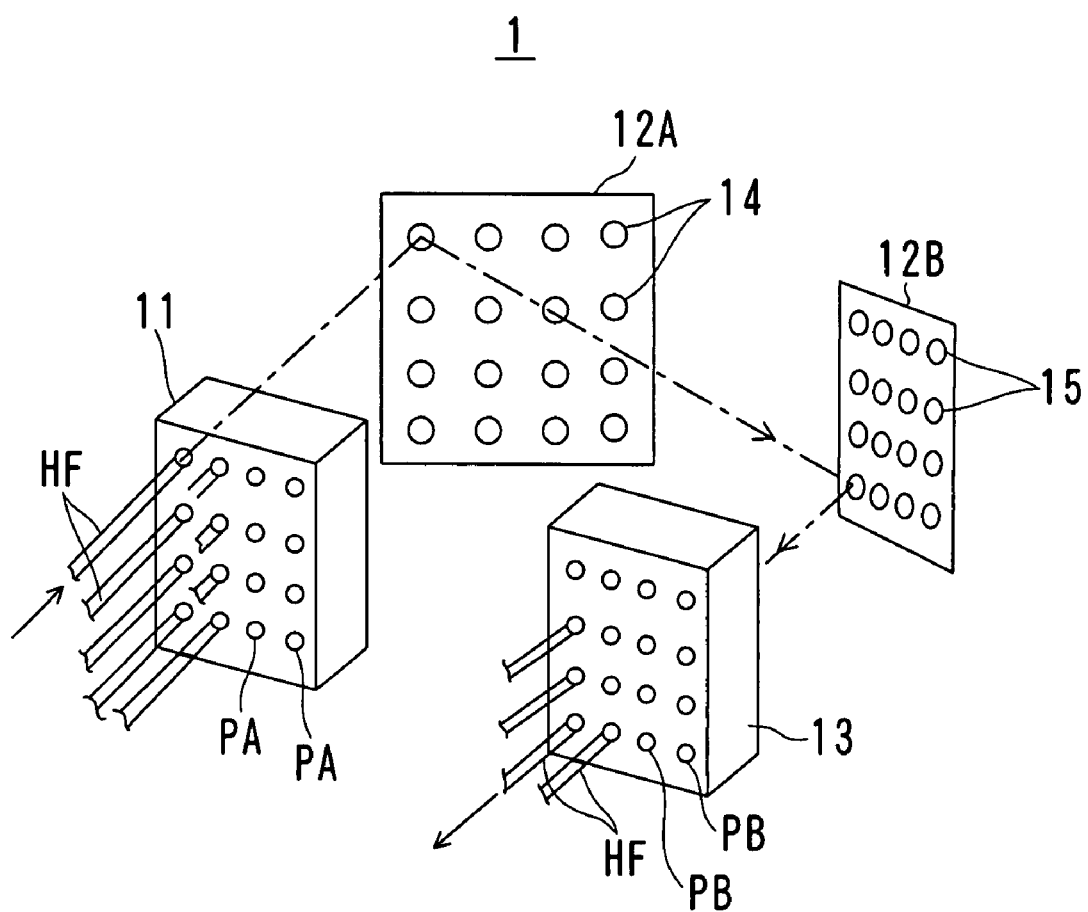
FIG. 1 is a diagram showing a mirror structure of an optical switching system according to a first embodiment of the present invention.

In FIG. 1, an optical switching system 1 is structured so that propagating directions of a plurality of optical signals that are led by an optical fiber HF and enter from an input port device 11 are switched by optical switches 12A and 12B and go out from a predetermined output port device 13.

The optical switching system 1 shown in FIG. 1 has the input port device 11 and the output port device 13 each of which has 4×4 input ports PA's or PB's arranged like a matrix. Each of the optical switches 12A and 12B is made up of 4×4 micro mirrors 14, 14 . . . , and 15, 15 . . . which are arranged like a matrix similarly.

Light entering from one of the sixteen input ports PA enters one of the micro mirrors 14 of the optical switch 12A located on the optical axis and is reflected there. In addition, one of the sixteen output ports PB receives light from one of the micro mirrors 15 of the optical switch 12B that is located on one of the optical axes. In other words, the input ports PA and the micro mirrors 14 of the optical switch 12A arranged like a matrix of 4×4 each correspond to each other one by one, and similarly the output ports PB and the micro mirrors 15 of the optical switch 12B correspond to each other one by one. Correspondences between the input ports PA and the output ports PB are determined in accordance with relationships between the micro mirrors 14 of the optical switch 12A and the micro mirrors 15 of the optical switch 12B.

Each of the micro mirrors 14 and 15 is a DMD (Digital Micro mirror Device) manufactured by a MEMS technique, for example. Each mirror is supported by a parallel plate type electrostatic actuator, and the angle of its reflecting surface can be controlled.

Such optical switches 12A and 12B, and the micro mirrors 14 and 15 themselves are known, and various types of structures and arrangements can be adopted as the optical switching system 1 of the present embodiment.

Figure 2:
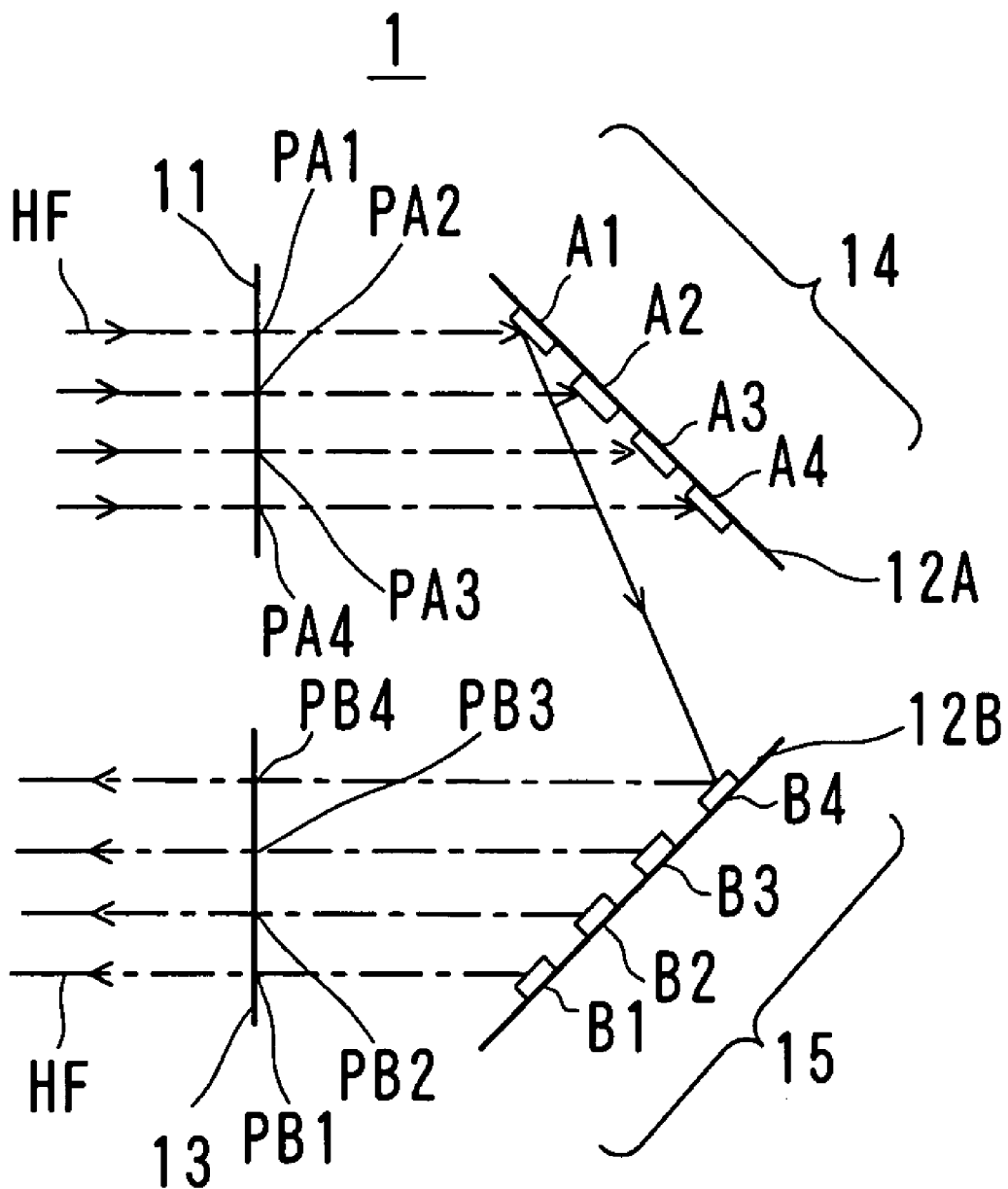
FIG. 2 is a diagram showing an optical switching system 1 shown in FIG. 1 as a plan view.

As shown in FIG. 2, the input ports PA as well as the output ports PB have optical axes that are parallel to each other, and the optical switches 12A and 12B are disposed to incline with respect to the optical axis by 45 degrees. When the angles of the micro mirrors 14 and 15 are controlled, one of the input ports PA is connected to one of the output ports PB optically, so that an optical path is formed.

Note that FIG. 2 shows a model in which four input ports PA and four output ports PB are disposed, four micro mirrors A1, A2, A3 and A4 are disposed as the input side optical switch 12A, and four micro mirrors B1, B2, B3 and B4 are disposed as the output side optical switch 12B.

According to this model, when the angles of 4×2 micro mirrors A1-A4 and B1-B4 are controlled, four input ports PA1-PA4 can be connected to four output ports PB1-PB4 in every combination. Usually, the connection is performed so that an optical signal entering from one input port PA goes out from only one output port PB, or that an optical signal going out from one output port PB enters from only one input port PA. However, without being limited to such a connection, it is possible to perform connection so that an optical signal can be transmitted from one input port PA to a plurality of output ports PB or from a plurality of input ports PA to one output port PB.

Hereinafter, for simple description, the example in which 4×2 micro mirrors A1-A4 and B1-B4 are controlled as shown in FIG. 2 will be described unless otherwise indicated. Note that any of the micro mirrors A1-A4 and B1-B4 or all of them may be referred to as a "micro mirror A".

Figure 3:
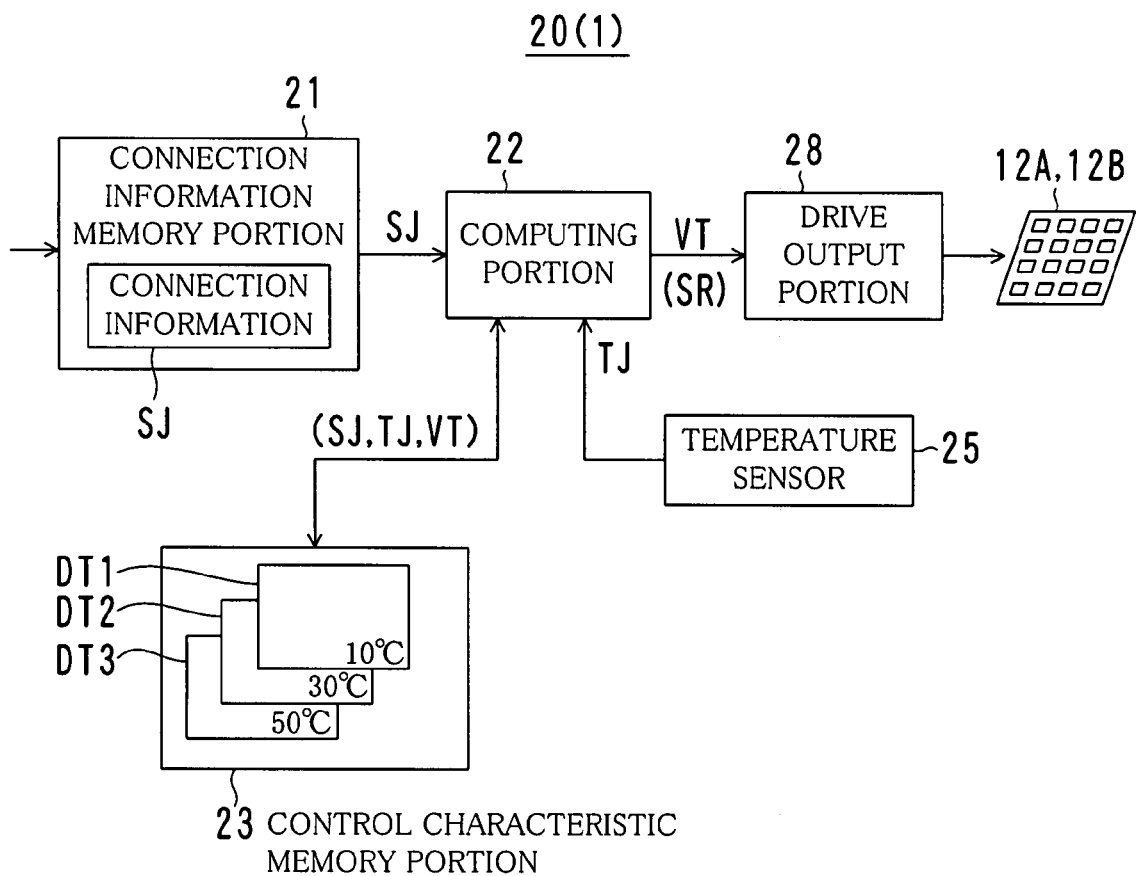
FIG. 3 is a block diagram showing a structure of a control portion of the optical switching system.

In FIG. 3, a control portion 20 includes a connection information memory portion 21, a computing portion 22, a control characteristic memory portion 23, a temperature sensor 25 and a drive output portion 28.

The connection information memory portion 21 stores connection information SJ between the input port device 11 and the output port device 13. In other words, the connection information memory portion 21 stores the connection information SJ between the input ports PA1-PA4 and the output ports PB1-PB4. This connection information SJ is sent from a computer that manages the optical switching system 1, for example, in accordance with a request at that time. Note that a DPRAM (Dual Port Random Access Memory) or other semiconductor memory is used as the connection information memory portion 21.

The computing portion 22 calculates a controlled variable SR of the micro mirror A based on the connection information SJ and control characteristic data DT obtained from the control characteristic memory portion 23. The controlled variable SR is finally a value of voltage (voltage value) VT that is applied to a control electrode of the micro mirror so as to drive the micro mirror A.

The computing portion 22 reads out appropriate control characteristic data DT for each micro mirror A from the control characteristic memory portion 23 based on the connection information SJ and temperature TJ, for example. The control characteristic data DT includes data of a value of voltage (voltage value VT) to be applied to each micro mirror A, control angle θ of each micro mirror A or the like. The controlled variable SR is calculated based on the data.

In this case, if the control characteristic data DT includes the voltage value VT, it is possible to make the voltage value VT be the controlled variable SR as it is. In this case, it is possible to perform operation for correcting an error due to cross talk with respect to the control characteristic data DT.

In addition, if the control characteristic data DT includes the control angle θ of the micro mirror A, the voltage value VT is determined from the control angle θ. Note that a relationship between the control angle θ and the voltage value VT can be shown in the equation (1) below.

$$\theta = \alpha \times (VT)^2 \quad (1)$$

In other words, the control angle θ of the micro mirror is proportional to the square of the voltage value VT for driving the micro mirror. Here, α is a unique constant defined by the hardness or the like of each micro mirror.

Note that the computing portion 22 reads the connection information SJ stored in the connection information memory portion 21 at regular intervals or by the interruption, for example. If there is a change in the read connection information SJ, the computing portion 22 reads the temperature TJ sensed by the temperature sensor 25. Then, the control characteristic data DT of a temperature TJ that is closest to the read temperature TJ is used for the control.

In addition, for example, the computing portion 22 reads the temperature TJ from the temperature sensor 25 at regular intervals and performs the control based on the temperature TJ. In this case, as the interval for example, it reads the temperature TJ every ten seconds or every 10-60 seconds. Alternatively, it is possible to read the temperature TJ at an appropriate interval of approximately 1-10 minutes.

The control characteristic memory portion 23 stores the control characteristic data DT of the micro mirror A for a plurality of temperatures TJ. More specifically, the control characteristic memory portion 23 stores the control characteristic data DT1, DT2 and DT3 of the micro mirrors A at three temperatures TJ of 10 degrees, 30 degrees and 50 degrees, for example, as shown in FIG. 3. The control characteristic data DT1-DT3 may be referred to as an "initial value table". In other words, the control characteristic data DT1-DT3 for the micro mirrors A are stored as the initial value table at the temperatures TJ in this case.

Figure 5:
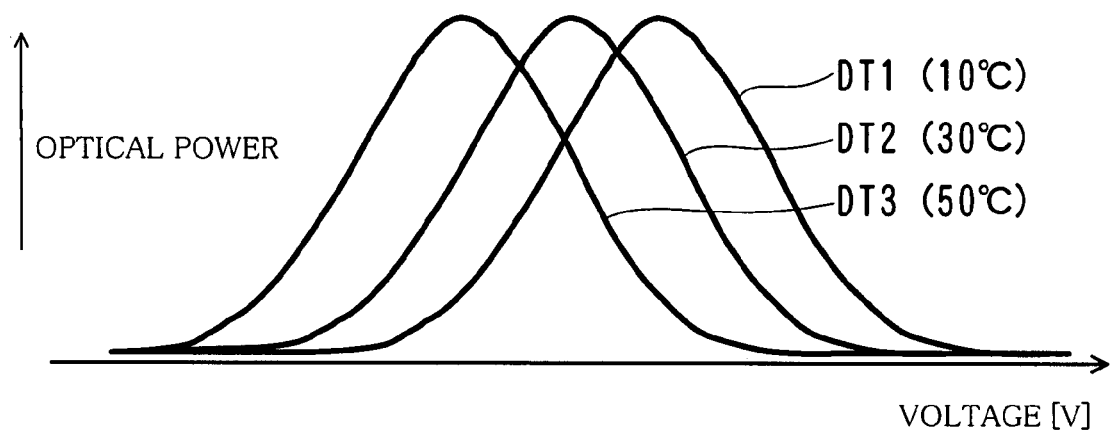
FIG. 5 is a diagram showing an example of control characteristic data at three temperatures.

The voltage value VT or the control angle θ stored as the control characteristic data DT is data indicating the control characteristics shown in FIG. 5, which can be obtained by real measurement. For example, it is obtained by measuring the optical power corresponding to the voltage value VT or the control angle θ by applying the voltage only to the micro mirror to be a target in the state where micro mirrors except the micro mirror to be a target is made OFF, i.e., the state where the voltage is not applied to the mirrors. The optical power indicates the intensity of light that is transmitted from the input port device 11 to the output port device 13 via the micro mirror. The optical power increases if a loss is small, while the optical power decreases if a loss is large.

Figure 6:
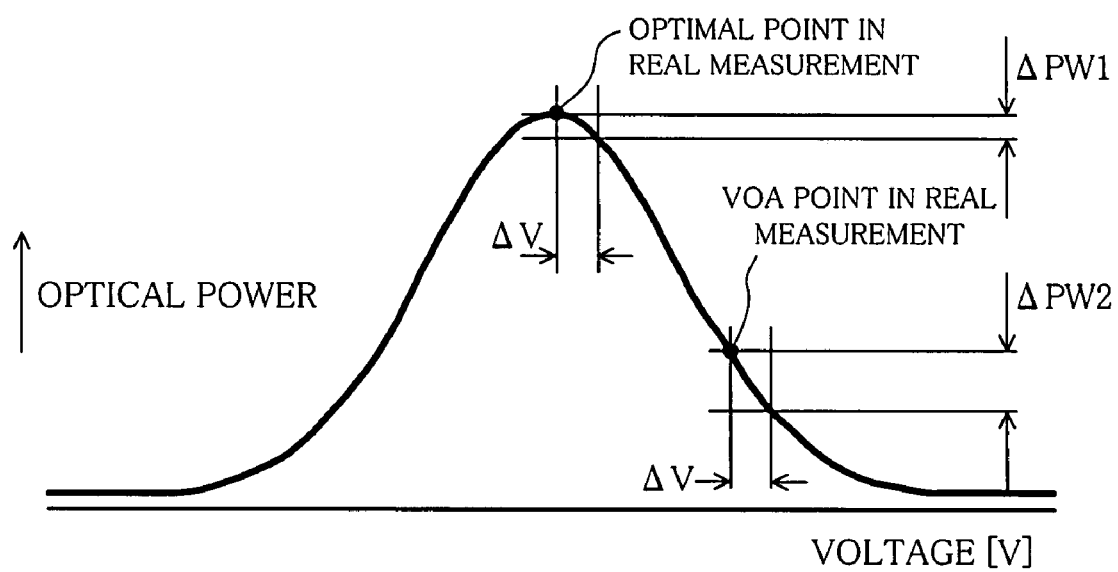
FIG. 6 is a diagram for explaining variation quantity of optical power with respect to voltage variation.

FIG. 5 shows an example of the control characteristic data DT1-DT3 at three temperatures TJ of 10 degrees, 30 degrees and 50 degrees with respect to one micro mirror and one piece of connection information SJ. The control characteristic data DT1-DT3 at the three temperatures have a relationship in which they are shifted from each other in the horizontal axis direction as shown in FIG. 5. In other words, the control characteristic data DT1-DT3 are levels of the optical power with respect to the voltage (voltage value VT) to be applied to the micro mirror, which is data including a maximum point of the optical power and expanding to near left and right sides of the maximum point. As shown in FIGS. 5 and 6, a graph of the optical power with respect to the voltage value VT applied to the micro mirror, i.e., the control characteristic data DT becomes a Gauss distribution in general.

Naturally, a theoretical value (expected value) of the appropriate control angle θ of the micro mirror can be calculated based on the geometrical arrangement of the micro mirror, the input port device 11 and the output port device 13. Actually, however, it is deviated from the expected value because of variations of their structures, an assembling error of an optical system such as a lens. Therefore, the control characteristic data DT is determined by real measurement in which light having reference intensity enters from the input port device 11 and an optical monitor or the like is connected to the output port device 13. For example, the control angle θ (optimal point in the real measurement), the VOA angle (VOA point in the real measurement) and the like having a smallest loss (optical coupling loss) are measured.

As shown in FIG. 6, if the voltage value VT or the control angle θ of the micro mirror varies due to temperature variation or the like, variation quantity of the optical power at the VOA point in the real measurement becomes much larger than variation quantity of the optical power at the optimal point in the real measurement. In the example shown in FIG. 6, with respect to the voltage variation of ΔV, the variation quantity ΔPW2 of the optical power at the VOA point in the real measurement is much larger than the variation quantity ΔPW1 of the optical power at the optimal point in the real measurement. Since the micro mirror has the feature that the VOA can be performed easily, the operation at the VOA point is the main operation in the ordinary case.

Since a portion of the voltage value VT lower than the maximum point (optimal point) is used usually for the control in the control characteristic data DT shown in FIGS. 5 and 6, it is sufficient that the control characteristic data DT include the left side portion of the maximum point (optimal point).

Figure 7:
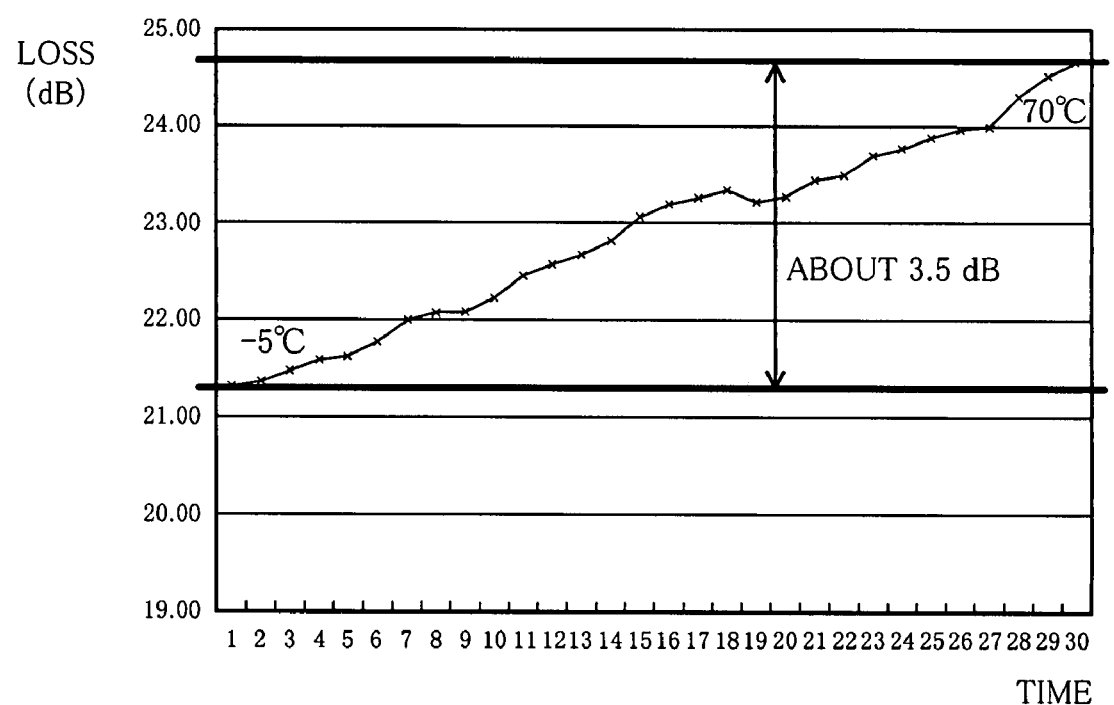
FIG. 7 is a diagram showing transition of an optical coupling loss due to temperature variation together with time course.

FIG. 7 shows a relationship between the loss variation and the variation of the temperature TJ in the case where −20 dB attenuation is given. The example of FIG. 7 shows how the loss varies as time passes when the temperature is changed rapidly from −5 degrees to 70 degrees. According to this example, the variation of loss increases as time passes, and loss variation of approximately 3.5 dB is generated when 30 minutes passes.

The temperature sensor 25 senses the temperature TJ in the optical switching system 1. In other words, the temperature sensor 25 senses the temperature TJ from time to time when the optical switching system 1 is used. In addition, the temperature sensor 25 may be used when the control characteristic data DT is measured actually.

Figure 4:
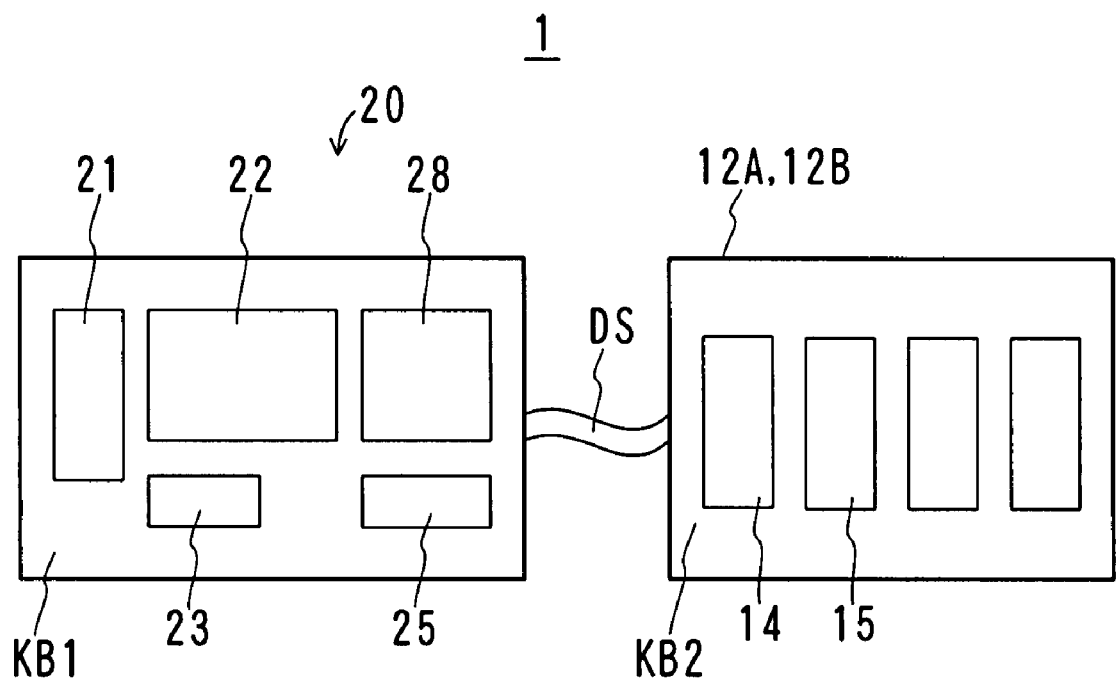
FIG. 4 is a plan view showing an example of a circuit arrangement of the control portion.

As the temperature sensor 25, one that utilizes characteristics of a semiconductor, one that uses a thermocouple or other one having various structures and shapes that are known or unknown can be used. The temperature sensor 25 is mounted on a printed circuit board KB1 together with circuit elements that realize the connection information memory portion 21, the computing portion 22 or the like as shown in FIG. 4, for example. Alternatively, it is disposed at the vicinity of the substrate KB2 that supports the optical switches 12A and 12B or the input port device 11 and the output port device 13 and is attached to it. Therefore, the temperature sensor 25 senses environment temperature (ambient temperature) of the optical switching system 1. Note that the two substrates KB1 and KB2 are connected to each other via electric wires DS in FIG. 4.

When the temperature TJ varies, variation occurs in characteristics of the micro mirror, particularly in characteristics of the voltage value VT to be applied with respect to the optical power (loss quantity), and various fabrics that constitute the optical switching system 1, particularly a lens or the like that is an optical functional component is expanded or contracted. In addition, the control portion 20 that uses the semiconductor circuit element also changes its characteristics in accordance with the temperature TJ. Therefore, the control characteristic data DT are measured actually as for low temperature, medium temperature and high temperature within the temperature range in which the optical switching system 1 is used actually, and the measured data are stored in the control characteristic memory portion 23.

The drive output portion 28 drives the micro mirror A based on the controlled variable SR. The drive output portion 28 is, for example, an AD converter (ADC) that converts the digital voltage value VT delivered from the computing portion 22 into the analog output voltage V. The driving quantity, i.e., the control angle θ of the micro mirror A is determined by the output voltage V from the drive output portion 28.

In the present embodiment, influence due to variation of the environment temperature is suppressed, so that the control of the micro mirror can be performed stably with high accuracy. In other words, as described above, the control characteristic data DT1-DT3 of the micro mirrors are obtained at three temperatures as described above, and the data DT1-DT3 are stored as the initial value table in the control characteristic memory portion 23.

The computing portion 22 refers to the control characteristic data DT stored in the control characteristic memory portion 23 based on the connection information SJ and the temperature TJ sensed by the temperature sensor 25 so as to calculate the controlled variable SR for angle control of the micro mirror. If the control characteristic data DT includes the voltage value VT to be applied to each micro mirror, the voltage value VT is regarded as the controlled variable SR.

Figure 8:
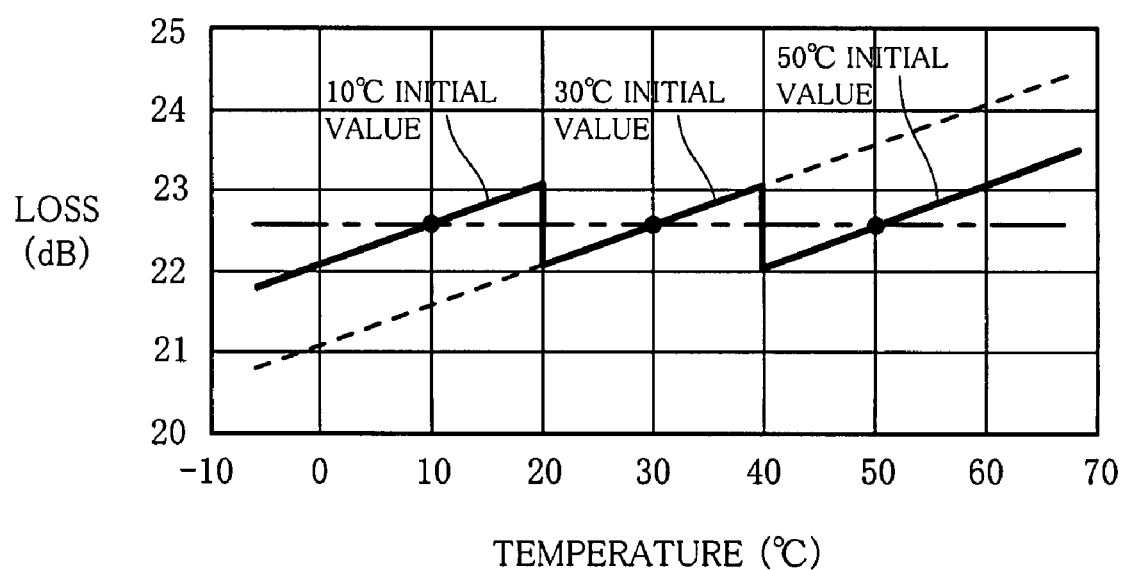
FIG. 8 is a diagram showing a loss variation with respect to temperature variation.

More specifically, in FIG. 8, if the temperature TJ sensed by the temperature sensor 25 is lower than 20 degrees, the control characteristic data DT1 of 10 degrees is used. If the temperature TJ is 20 degrees or higher and is lower than 40 degrees, the control characteristic data DT2 of 30 degrees is used. If the temperature TJ is higher than 40 degrees, the control characteristic data DT3 of 50 degrees is used. As a result, although a small error occurs in each temperature range, the error is within a small range as a whole.

In other words, if the temperature TJ is 10 degrees, 30 degrees or 50 degrees, there is no error or a very small error. However, as the temperature TJ goes away from these temperatures, the error increases at a constant rate. However, the error is not accumulated through all the temperatures of use, but the error only occurs in a narrow range that is obtained by dividing the whole range of temperature of use by three. Therefore, the error is decreased as a whole, and the influence of the temperature variation is suppressed so that the control can be performed stably with relatively high accuracy. In FIG. 8, an ideal controlled state has a constant loss regardless of the temperature as shown in the dashed dotted line.

For example, if only the control characteristic data DT2 of 30 degrees is used for performing the control of the whole temperature range, the error increases at low and high temperatures so that accurate control cannot be performed as shown by the broken line in FIG. 8.

In contrast, although the optical switching system 1 of the present embodiment causes an error in a certain range, the error is controlled in the narrow range within a wide temperature range in which the optical switching system 1 is used, so that the control can be performed with accuracy that is sufficient for practical use.

The optical switching system 1 having the structure described above can perform compensation for temperature in an open loop, so that the structure becomes simple and it does not increase the mounting area.

In the embodiment described above, filtering of the control signal indicating the control angle θ is performed for removing or reducing mechanical resonance of the micro mirror A. Therefore, it is possible to provide a filtering portion for performing such a filtering process to the computing portion 22. In addition, when the computing portion 22 computes the control angle θ or the voltage value VT, it may compute including such a filtering process.

In addition, the computing portion 22 may perform the filtering process by using appropriate parameters with respect to individual micro mirrors A or by using the same parameter with respect to every micro mirror A. Such a computing portion 22 may be structured with a special hardware circuit or by using DSP, CPU or the like, or by combination thereof.

Note that the connection information memory portion 21 and the computing portion 22 perform the process with a digital signal, and the drive output portion 28 performs the process of converting the digital signal to an analog signal. It is necessary to provide the drive output portions 28 whose number physically corresponds to the number of micro mirrors A. However, each of the connection information memory portion 21 and the computing portion 22 may be only one physically. In addition, although the temperature sensor 25 is only one in the present embodiment, it is possible to provide a plurality of temperature sensors.

Although the control characteristic data DT at three temperatures are stored in the connection information memory portion 21 in the embodiment described above, it is possible to make the three temperatures be different from the temperatures in the above example. It is possible to obtain the control characteristic data bT without effort as long as they are the control characteristic data DT at three temperatures. However, it is possible to store the control characteristic data DT not at three temperatures but at four or more temperatures.

Second Embodiment

Next, an optical switching system 1B of a second embodiment will be described.

The optical switching system 1B of the second embodiment is basically the same as the optical switching system 1 of the first embodiment, so only the different parts will be described.

Figure 9:
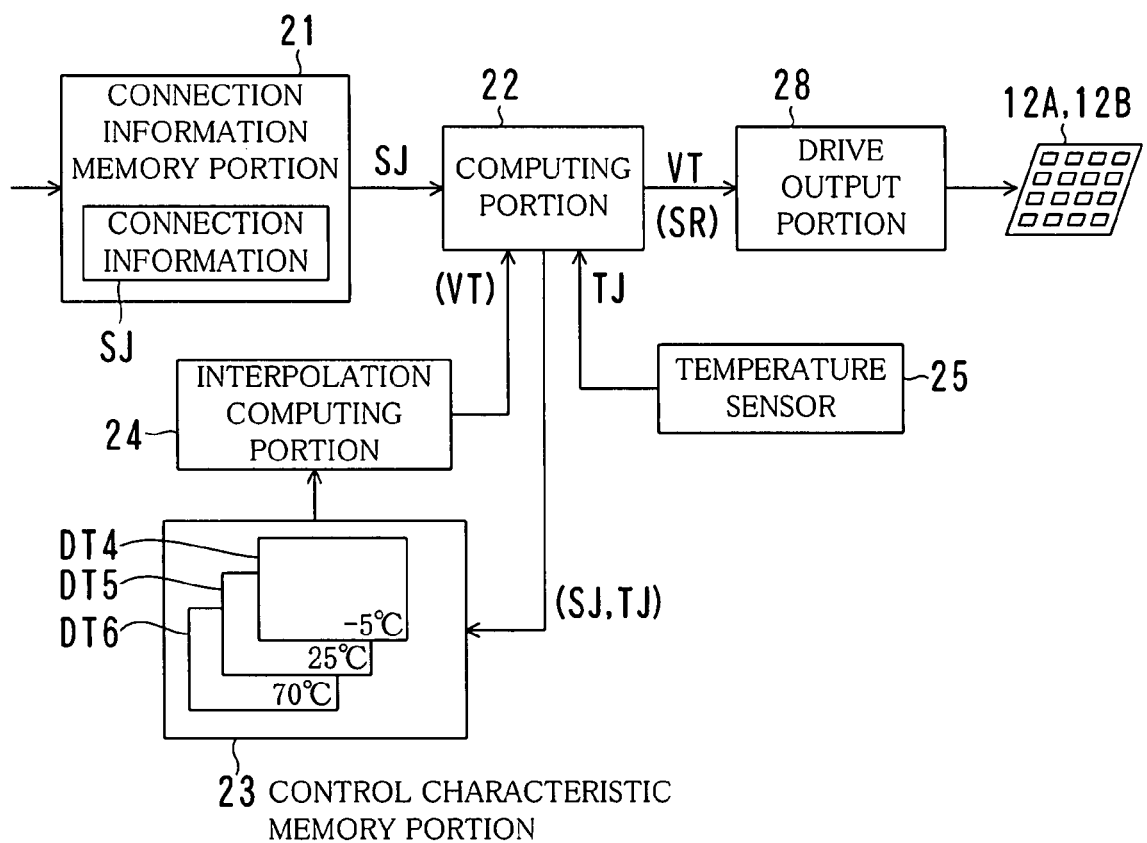
FIG. 9 is a block diagram showing a structure of the control portion according to a second embodiment of the present invention.
Figure 10:
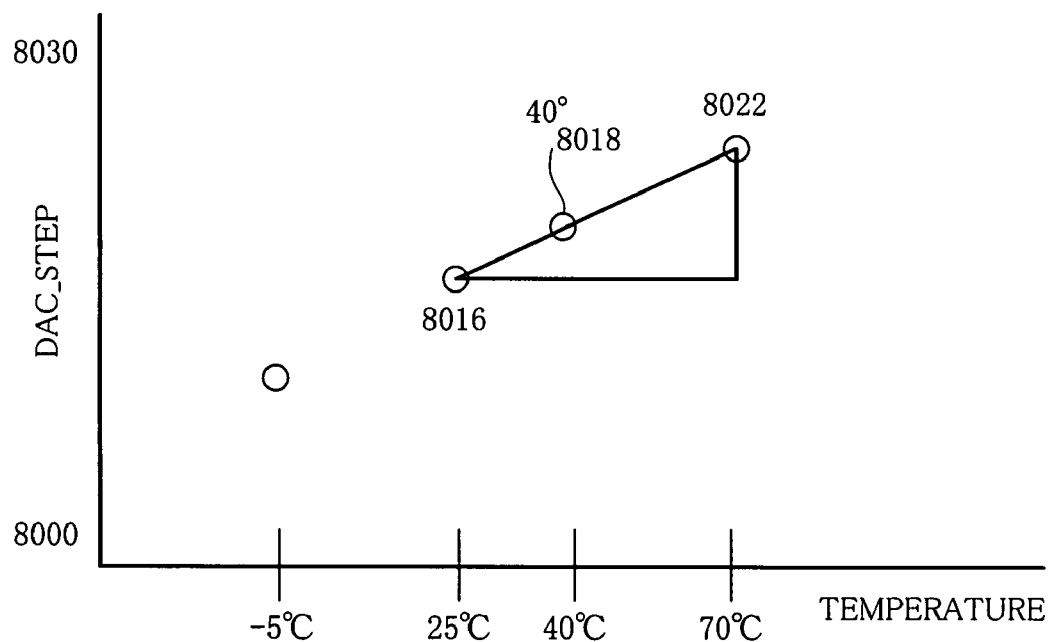
FIG. 10 is a diagram for explaining a concrete example of a linear interpolation.

FIG. 9 is a block diagram showing a structure of a control portion 20B of the optical switching system 1B according to the second embodiment of the present invention, and FIG. 10 is a diagram for explaining a concrete example of linear interpolation.

In FIG. 9, the control portion 20B is equipped with an interpolation computing portion 24. The interpolation computing portion 24 determines the control characteristic data DT corresponding to the temperature TJ sensed by the temperature sensor 25 by interpolation using the control characteristic data DT corresponding to two upper and lower temperatures that are close to the temperature TJ sensed by the temperature sensor 25. Thus, the error due to temperature variation is further reduced, so that the variation of loss can be further suppressed. Note that linear interpolation is performed, for example, as the method of interpolation. In addition, the control characteristic data DT4-DT6 at three temperatures TJ of −5 degrees, 25 degrees and 70 degrees are stored in the control characteristic memory portion 23 in the second embodiment.

It is supposed that the temperature TJ sensed by the temperature sensor 25 is 40 degrees, for example. It is supposed that values of the control characteristic data DT at 25 degrees and 70 degrees, for example, the voltage values VT are "8016" and "8022", respectively as shown in FIG. 10. In this case, a difference of the controlled variable SR per degree is calculated as "(8022−8016)/(70−25)=0.1333. Therefore, if the temperature TJ is 40 degrees, it is calculated as 8016+ [0.1333×(40−25)]=8018. The control is performed based on the voltage value VT determined in this way.

Note that the vertical axis in FIG. 10 indicates a step in the drive output portion 28, and it is different from the controlled variable SR itself such as the voltage value VT but corresponds to the value.

According to the second embodiment, the control characteristic data DT corresponding to the temperature TJ that is actually sensed is determined by interpolation with respect to the control characteristic data DT that are set only discretely to the temperature TJ. Therefore, the error due to the temperature variation can be reduced more than the case of the first embodiment so that the control can be performed stably with higher accuracy.

Third Embodiment

Next, an optical switching system 1C of a third embodiment will be described. Here, only the parts different from the optical switching system 1B of the second embodiment will be described.

Figure 11:
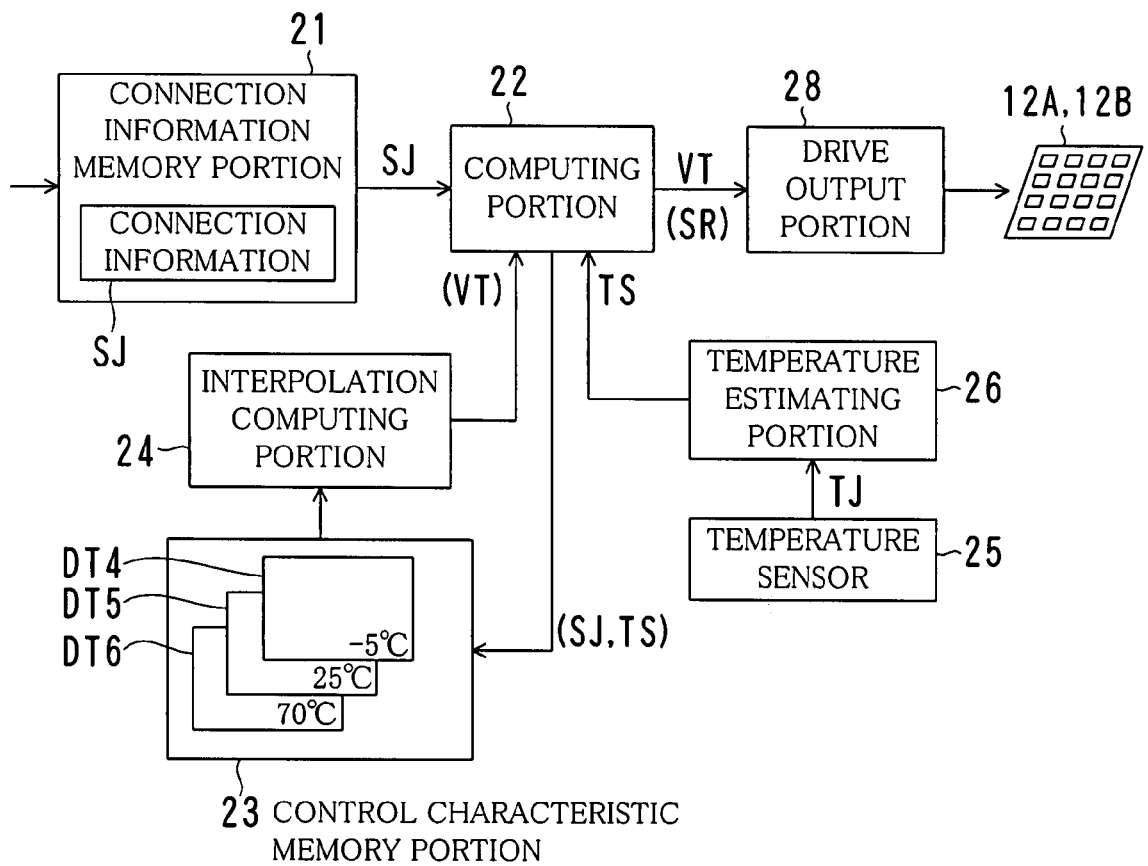
FIG. 11 is a block diagram showing a structure of the control portion according to a third embodiment of the present invention.
Figure 12A:
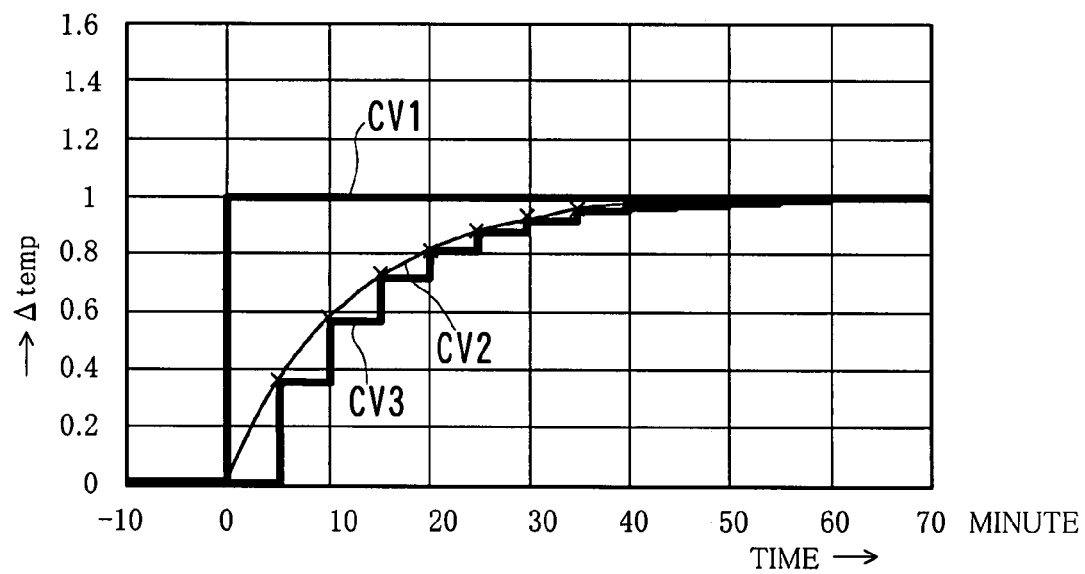
FIGS. 12A and 12B are diagrams for explaining an operation of a temperature estimating portion.
Figure 12B:
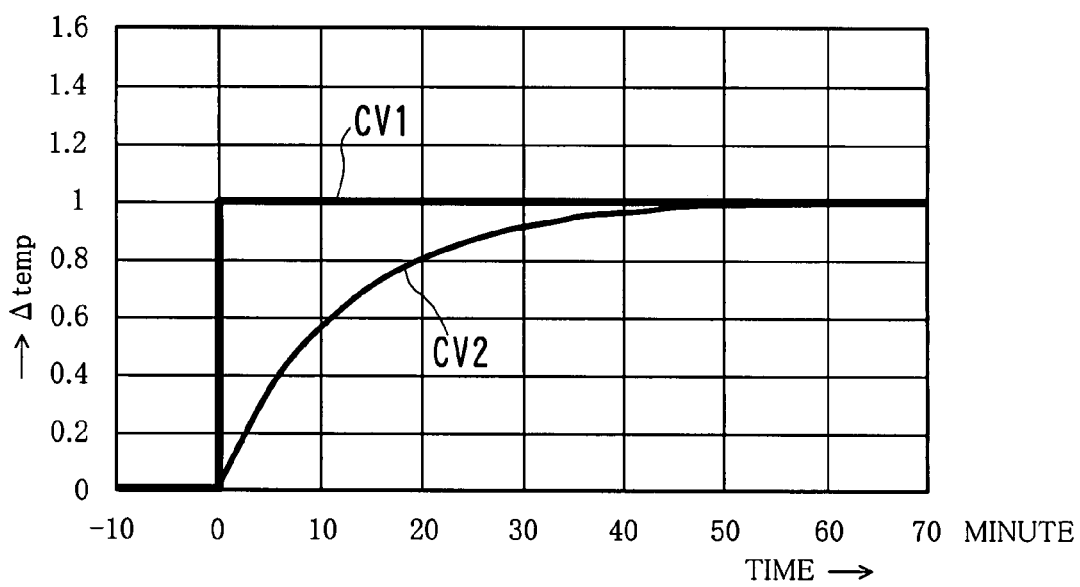

FIG. 11 is a block diagram showing a structure of a control portion 20C of the optical switching system 1C according to the third embodiment of the present invention, FIGS. 12A and 12B are diagrams for explaining an operation of a temperature estimating portion 26.

In FIG. 11, the control portion 20C is provided with the temperature estimating portion 26. The temperature estimating portion 26 estimates temperature of the micro mirror based on the temperature TJ sensed by the temperature sensor 25. More specifically, although the temperature sensor 25 is provided to the control portion 20C and senses environment temperature thereof, the sensed temperature is not temperature inside the micro mirror but ambient temperature of the micro mirror or temperature on the surface of the same. Therefore, if the control is performed based on the temperature TJ sensed by the temperature sensor 25, a shift may occur in the control because of the difference of temperature with the inside temperature of the micro mirror. Therefore, in order to cancel this shift, the inside temperature of the micro mirror is estimated by calculating it from the temperature TJ sensed by the temperature sensor 25. The computing portion 22 calculates the controlled variable SR of the micro mirror based on the temperature TS estimated by the temperature estimating portion 26. The temperature estimating portion 26 performs the calculation of the temperature estimation by performing time constant computing by using the temperature time constant CR of the micro mirror.

More specifically, as shown in FIGS. 12A and 12B, it is supposed that there is temperature variation (Δtemp) from "0" to "1" at the time point t=0. This temperature variation is a variation of the environment temperature with respect to the micro mirror and is shown by the curve CV1. In addition, as for the variation of the environment temperature shown by the curve CV1, the inside temperature variation of the micro mirror is shown by the curve CV2.

Since the environment temperature is sensed by the temperature sensor 25, the temperature TJ sensed by the temperature sensor 25 is shown by the curve CV1. In addition, since the curve CV2 indicating the inside temperature of the micro mirror cannot be measured directly by the temperature sensor 25, the temperature time constant CR of the micro mirror is used for the estimation.

Note that the curve CV2, which is a variation of the inside temperature of the micro mirror, differs depending on the place even if it is inside the micro mirror. Therefore, the curve CV2 can be said to be temperature variation of a typical part considering the influence on the optical characteristics.

More specifically, the temperature time constant CR is determined in accordance with specific heat, a structure, the surface area, the surface shape, the surface state and the like of an object, and it has a value related to time until the whole object exposed to a certain environment temperature reaches the environment temperature. The inside temperature TS of the object can be calculated for the estimation from the equation (2) below by using the temperature TJ that is the environment temperature, elapsed time t from the time point when the environment temperature becomes the temperature TJ and the temperature time constant CR.

$$TS=TJ[1-e(-t/CR)] \qquad (2)$$

Note that the curve CV2 shown in FIGS. 12A and 12B is determined by regarding the temperature time constant CR as "12" minutes. However, it is possible to use other value in accordance with a material or a structure of the micro mirror, or a material or a structure of a member to be a target.

Therefore, in the first and the second embodiments in which the control is performed by using the temperature TJ sensed by the temperature sensor 25, there is a remaining error corresponding to the space between the curve CV1 and the curve CV2 shown in FIG. 12B at each time point t.

In contrast, in the third embodiment, the inside temperature TS of the micro mirror is determined by estimation, and the control is performed based on the determined inside temperature. Therefore, there is no remaining error if the estimation is completely correct. In reality, however, the inside temperature of the micro mirror is changing every moment as shown in curve CV2. Since it is difficult or not practical to perform continuous control along the curve CV2, the control is performed at timings of an appropriate period. For example, the temperature estimating portion 26 performs the temperature estimation every five minutes as shown by the mark "x" on the curve CV3 shown in FIG. 12A, and the control of the micro mirror is performed at the timing when each temperature estimation is performed.

In this way, if the temperature estimation is performed every five minutes for the control, there is only a slight error corresponding to the space between the curve CV3 and the curve CV2 remaining at each time point t.

In other words, the error occurs corresponding to the area surrounded by the curve CV1 and the curve CV2 shown in FIG. 12B if the control is performed by using the temperature TJ sensed by the temperature sensor 25, while only the error occurs corresponding to the small area surrounded by the curve CV2 and the curve CV3 shown in FIG. 12A if the temperature estimation is performed every five minutes.

Thus in the third embodiment, the shift between the actual temperature and the temperature TS to be used for the control is reduced by estimating the inside temperature of the micro mirror, so that the control can be performed with higher accuracy.

Note that the period of performing the temperature estimation should be short in order to perform the control with higher accuracy. Therefore, it is possible to perform the temperature estimation every 10 seconds, 30 seconds, one minute, two minutes, three minutes or the like, for example, so that the controlled variable SR is calculated at each timing.

In addition, when the temperature estimation is performed, in FIG. 12A for example, the estimated temperature TS after five minutes may be used for the control after a half period, i.e., 2.5 minutes, and the estimated temperature TS after 10 minutes may be used for the control after a half period, i.e., 5 minutes. Similarly, the estimated temperature TS may be used for the control at the timing after a half of the period that is used for estimation of the temperature TS, so that the discrete control can be close to control based on the actual temperature as a whole and that more accurate control can be performed.

Fourth Embodiment

Next, an optical switching system 1D of the fourth embodiment will be described. Here, only the parts different from the optical switching system 1C of the third embodiment will be described.

Figure 13:
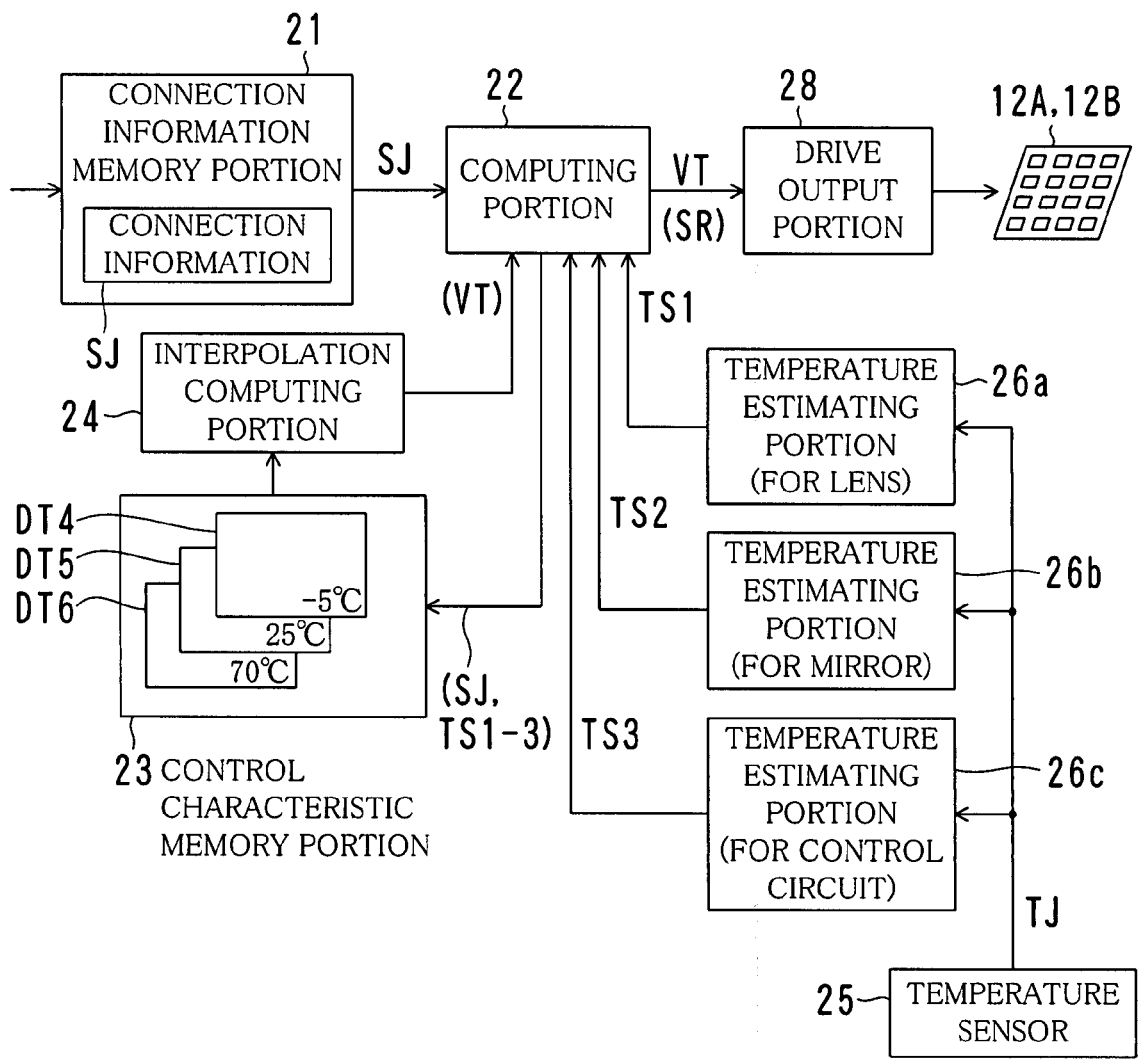
FIG. 13 is a block diagram showing a structure of the control portion according to a fourth embodiment of the present invention.
Figure 14A:
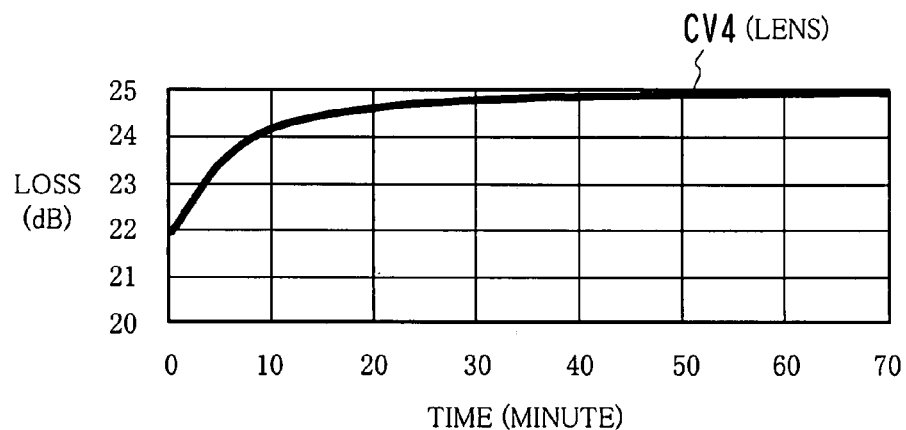
FIGS. 14A-14C are diagrams showing temperature characteristics of various types of fabrics.
Figure 14B:
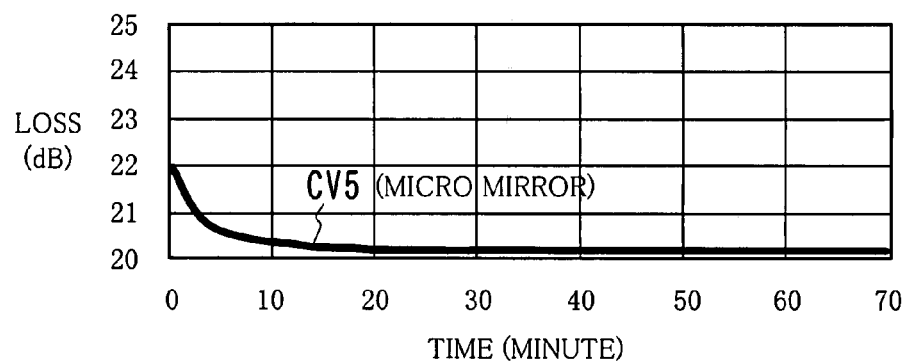
Figure 14C:
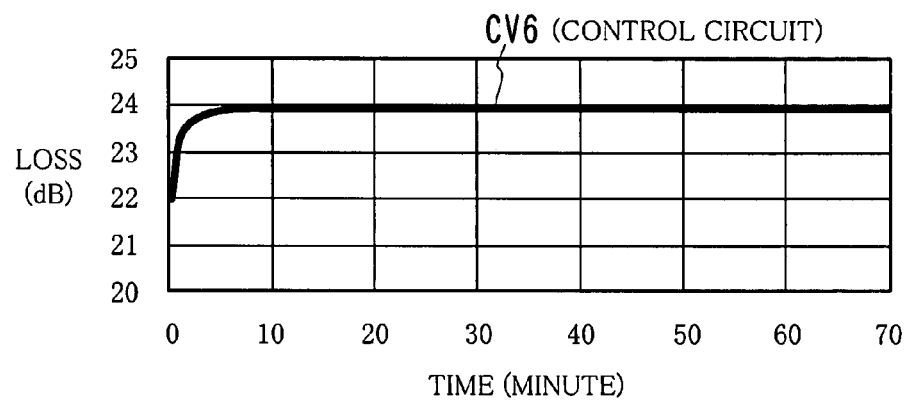
Figure 15A:
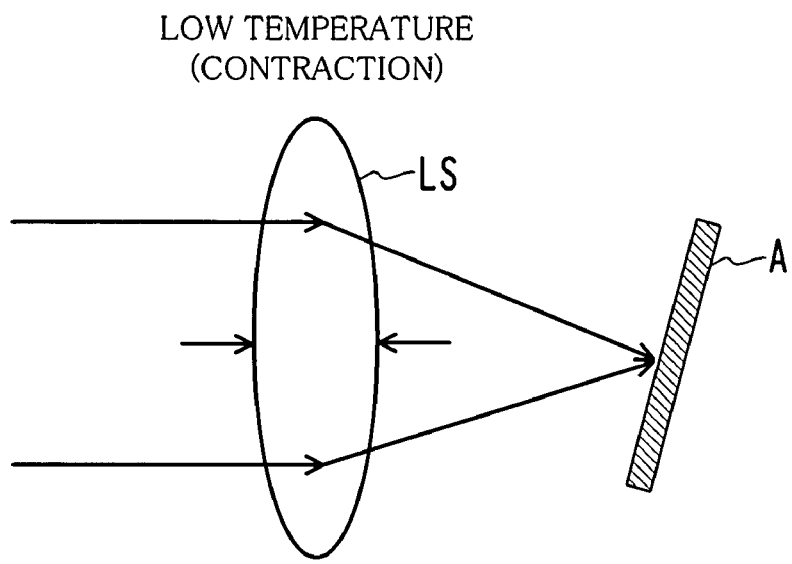
FIGS. 15A and 15B are diagrams showing a variation of an optical path due to a temperature variation of a lens.
Figure 15B:
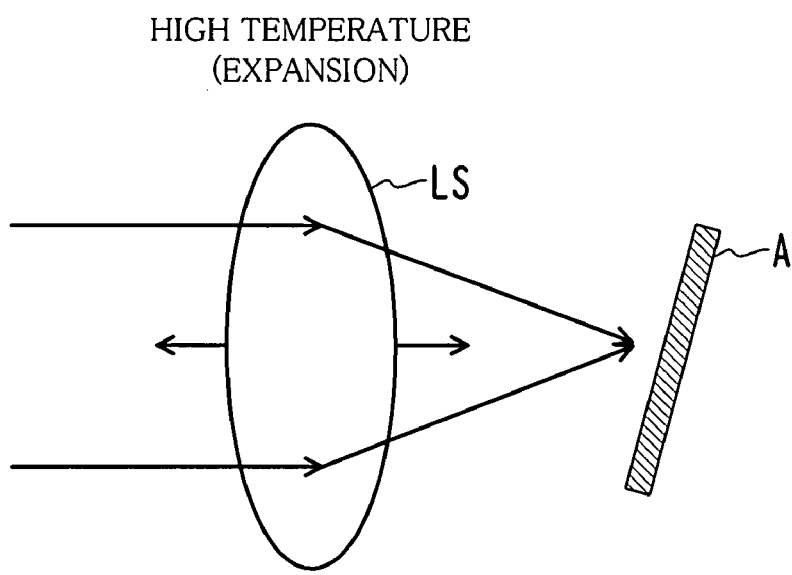
Figure 16A:
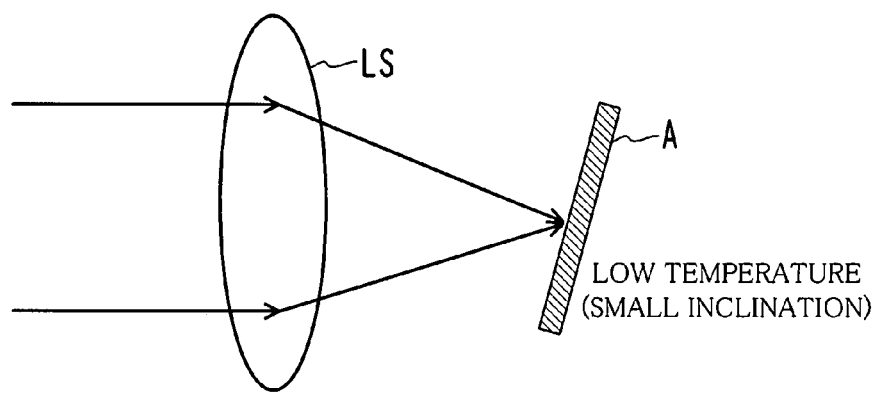
FIGS. 16A and 16B are diagrams showing a variation of an optical path due to a temperature variation of a micro mirror.
Figure 16B:
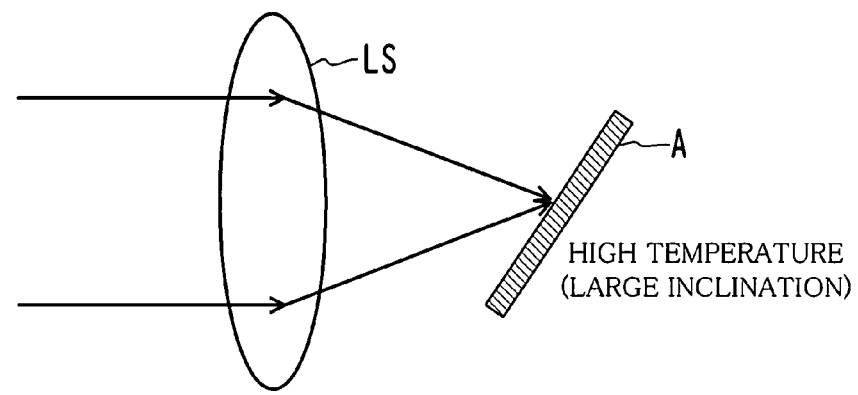

FIG. 13 is a block diagram showing a structure of a control portion 20D of the optical switching system 1D according to a fourth embodiment of the present invention, FIGS. 14A-14C are diagrams showing temperature characteristics of various types of fabrics, FIGS. 15A and 15B are diagrams showing schematically a variation of an optical path due to a temperature variation of a lens LS, and FIGS. 16A and 16B are diagrams showing schematically a variation of an optical path due to a temperature variation of a micro mirror A.

In FIG. 13, the control portion 20D is provided with three temperature estimating portions 26a, 26b and 26c. The temperature estimating portion 26a estimates the temperature TS1 of the lens LS based on the temperature TJ sensed by the temperature sensor 25. The temperature estimating portion 26b estimates the temperature TS2 of the micro mirror based on the temperature TJ in the same manner. The temperature estimating portion 26c estimates the temperature TS3 of the control portion 20D based on the temperature TJ in the same manner.

Each of the temperature estimating portions 26a-26c stores the temperature time constants CR1-CR3 of the lens LS, the micro mirror A or the control portion 20D as the time constant table, for example. The temperatures TS1-TS3 are estimated by using each of the temperature time constants CR1-CR3.

In FIGS. 14A-14C, the horizontal axis indicates the time, and the vertical axis indicates the loss. The loss increases as the value increases in the vertical axis direction, while the loss decreases as the values decreases in the vertical axis direction. FIGS. 14A-14C shows curves CV4-CV6 of the temperature characteristics when the temperature increases from 0 degree to 70 degrees at the time point t=0 with respect to the lens LS, the micro mirror A and the control portion (control circuit) 20D, respectively.

As shown in FIG. 14A, in the curve CV4 indicating the temperature characteristics of the lens LS, the initial loss at the time point t=0 is approximately 22 dB. Then, the loss increases due to the temperature variation up to approximately 25 dB in approximately 60 minutes, and the loss is saturated. In this case, the temperature time constant CR of the lens LS is "60" minutes, and the direction of the loss variation is "positive", i.e., the direction in which the loss increases due to increase of temperature, and the variation quantity is 3 dB.

One of the reasons for increase of the loss of the lens LS due to temperature variation is probably that the state where the focal point of the light is formed on the micro mirror A by the lens LS at low temperature (around −5 to 25 degrees) as shown in FIG. 15A may change to the state where increase of temperature of the lens LS expands the lens LS, which causes shortening of the focal length so that the focal point is not formed on the micro mirror A as shown in FIG. 15B.

As shown in FIG. 14B, although the initial loss is approximately 22 dB on the curve CV5 indicating the temperature characteristics of the micro mirror A, the temperature variation causes decrease of the loss, which reaches approximately 20 dB loss in approximately 30 minutes and is saturated. In this case, the temperature time constant CR of the micro mirror A is "30" minutes, and the direction of the loss variation is "negative", i.e., the direction in which the loss decreases when the temperature rises, and the variation quantity is 2 dB.

In this way, one of the reasons for decrease of the loss of the micro mirror A due to the temperature variation is probably that the state where the micro mirror A has a small inclination at low temperature as shown in FIG. 16A may change to the state where the inclination increases due to softening of the micro mirror A at high temperature with the same voltage value VT, which causes a shift of the VOA point and decrease of the loss as shown in FIG. 16B.

As shown in FIG. 14C, although the initial loss is approximately 22 dB on the curve CV6 indicating the temperature characteristics of the control portion 20D, the temperature variation causes increase of the loss, which reaches approximately 24 dB loss in approximately 10 minutes and is saturated. In this case, the temperature time constant CR of the control portion 20D is "10" minutes, the direction of the loss variation is "positive", and the variation quantity is 2 dB.

In this way, one of the reasons for increase of the loss of the control portion 20D due to the temperature variation is probably that high temperature causes increase of resistance of a circuit element, or that various circuit constants vary which causes variation of the power supply voltage, or due to temperature characteristics of an LSI such as the DAC or the DSP, or that there will be a variation in the voltage value VT delivered from them, or the like.

As described above, the lens LS, the micro mirror A and the control portion 20D have different temperature time constants CR, variation directions, variation quantities with respect to the temperature variation. Therefore, there are provided their temperature estimating portions 26a-26c with respect to the fabrics having different parameters including different temperature time constants CR, variation directions, variation quantities and the like.

Note that there are the lens LS, the micro mirror A and the control portion 20D as the fabrics as described above, but there are other fabrics such as a chassis to which they are mounted, a bracket, a frame, a case and the like. Among these fabrics, the temperature estimation should be performed for each of the members having different temperature time constants CR, variation directions and variation quantities with respect to a main member that may affect the optical characteristic of the optical switching system due to temperature variation.

In addition, the computing portion 22 reads out the corresponding data from the control characteristic data DT4-DT6 stored in the control characteristic memory portion 23 based on the temperatures TS1-TS3 supplied from the temperature estimating portions 26a-26c, for example. The interpolation computing portion 24 performs the interpolation with respect to the data, and the computing portion 22 decides the final controlled variable SR based on the data after the interpolation. In this case, when the interpolation computing portion 24 performs the interpolation, the control characteristic data DT of the individual fabrics corresponding to the temperature variation are obtained. Therefore, it is possible to decide the final controlled variable SR by calculating their weighted average or by multiplying an appropriate coefficient to it, for example. Furthermore, various methods other than those described above can be used as the usage of the temperatures TS1-TS3 and the control characteristic data DT, the method for interpolation by the interpolation computing portion 24, and the method for deciding the controlled variable SR.

In this way, in the fourth embodiment, the temperature estimating portions 26a-26c are provided for main fabrics individually so as to perform the temperature estimation, and the control of the micro mirror A is performed based on the estimate temperature TS. Therefore, the shift between the actual temperature of each fabric and the temperature TS that are used for the control can be reduced more, so that the control can be performed more accurately.

Although the micro mirrors A arranged in a linear manner are described in the above embodiments, the present invention can be applied to micro mirrors that are arranged in two or three dimensional manner.

In each embodiment described above, the structure and the shape of the optical switches 12A and 12B, the arrangement and the number of micro mirrors, and the like can be other than those described above. Furthermore, the structure, the configuration, the shape, the number, the material of the whole or each part of the computing portion 22, the control characteristic memory portion 23, the interpolation computing portion 24, the temperature sensor 25, the temperature estimating portion 26, the control portions 20, 20B-20D, and the optical switching systems 1, 1B-1D, the process contents, the process order and the like can be modified in accordance with the spirit of the present invention, if necessary.

Although the embodiment of the present invention is described together with some examples above, the present invention is not limited to the embodiment described above but can be embodied in various ways.

What is claimed is:

1. An optical switching system that switches optical paths between input ports and output ports by using a plurality of micro mirrors each of which has a reflecting surface whose angle is controllable, the optical switching system comprising:
   a connection information memory portion that stores connection information between the input ports and the output ports;
   a control characteristic memory portion that stores control characteristic data of the micro mirrors with respect to each of a plurality of temperatures;
   a temperature sensor that senses a temperature in the optical switching system;
   a temperature estimating portion that estimates a temperature of a member that constitutes the optical switching system based on the temperature sensed by the temperature sensor;
   a computing portion that refers to the control characteristic data stored in the control characteristic memory portion so as to calculate a controlled variable of the micro mirrors for controlling angles of the micro mirrors based on the connection information stored in the connection information memory portion and the temperature sensed by the temperature sensor;
   wherein the computing portion calculates the controlled variable of the micro mirror based on the temperature estimated by the temperature estimating portion.

2. The optical switching system according to claim 1, wherein the computing portion uses the control characteristic data corresponding to a temperature closest to the temperature sensed by the temperature sensor so as to calculate the controlled variables of the micro mirrors corresponding to the connection information.

3. The optical switching system according to claim 1, further comprising an interpolation computing portion that performs interpolation by using the control characteristic data corresponding to a temperature that is close to the temperature sensed by the temperature sensor.

4. The optical switching system according to claim 1, wherein the control characteristic data includes a level of optical power with respect to voltage to be applied to the micro mirror, which is data including a maximum point of the optical power and on a low voltage side from the maximum point.

5. An optical switching system that switches optical paths between input ports and output ports by using a plurality of micro mirrors each of which has a reflecting surface whose angle is controllable, the optical switching system comprising:
   a connection information memory portion that stores connection information between the input ports and the output ports;
   a control characteristic memory portion that stores control characteristic data of the micro mirrors with respect to each of a plurality of temperatures;
   a temperature sensor that senses a temperature in the optical switching system;
   a temperature estimating portion that estimates a temperature of a member that constitutes the optical switching system based on the temperature sensed by the temperature sensor; and
   a computing portion that refers to the control characteristic data stored in the control characteristic memory portion so as to calculate a controlled variable for controlling an angle of the micro mirror based on the connection information stored in the connection information memory portion and the temperature estimated by the temperature estimating portion.

6. The optical switching system according to claim 5, wherein the temperature estimating portion estimates each temperature of each of the members having similar temperature characteristics with respect to main members that constitute the optical switching system.

7. The optical switching system according to claim 6, wherein the temperature estimating portion estimates each temperature of the micro mirror, a lens and a control circuit as the members.

8. A control method of micro mirrors in an optical switching system that switches optical paths between input ports and output ports by using a plurality of micro mirrors each of which has a reflecting surface whose angle is controllable, the method comprising the steps of:
   storing control characteristic data of the micro mirrors with respect to each of a plurality of temperatures in a control characteristic memory portion;
   sensing, by a temperature sensor, an environment temperature in the optical switching system when it is used;
   estimating a temperature of a member that constitutes the optical switching system based on the temperature sensed by the temperature sensor;
   referring to the control characteristic data stored in the control characteristic memory portion so as to calculate a controlled variable for controlling angles of the micro mirrors so that a loss in the optical switching system becomes appropriate based on the estimated temperature and given connection information; and
   controlling the micro mirrors based on the calculated controlled variable.

* * * * *